R. D. CLARK & R. WELLS.
COOKING UTENSILS.
No. 193,486. Patented July 24, 1877.
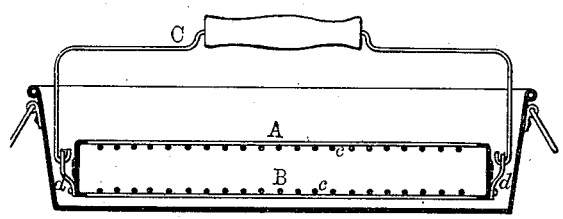
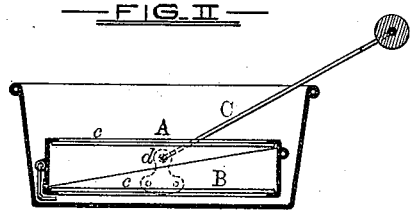
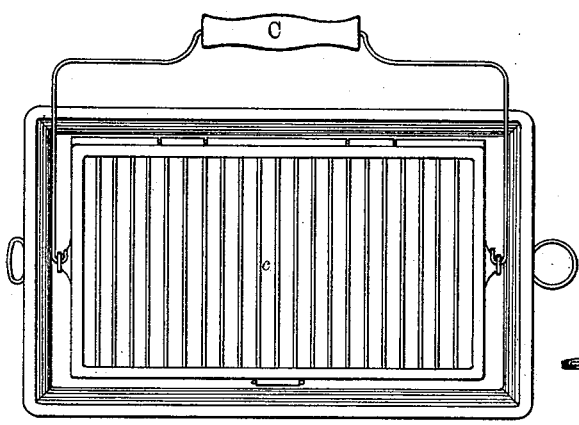
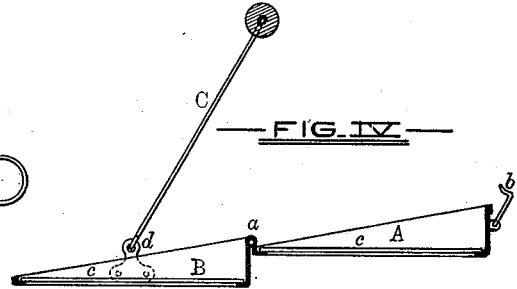
WITNESSES:
Wm. W. Towson
John L. Long
INVENTORS:
Richard D. Clark,
Richard Wells,
by G. H. & W. T. Howard
Attys.

UNITED STATES PATENT OFFICE.

RICHARD D. CLARK AND RICHARD WELLS, OF BALTIMORE, MARYLAND.

IMPROVEMENT IN COOKING UTENSILS.

Specification forming part of Letters Patent No. 193,486, dated July 24, 1877; application filed January 18, 1877.

*To all whom it may concern:*

Be it known that we, RICHARD D. CLARK and RICHARD WELLS, both of the city of Baltimore and State of Maryland, have invented certain Improvements in Cooking Utensils, of which the following is a specification; and we do hereby declare that in the same is contained a full, clear, and exact description of our said invention, reference being had to the accompanying drawing, and to the letters of reference marked thereon.

This invention relates to an improved device to be used in connection with an ordinary frying-pan in the frying of oysters, fish, and the like; and consists in a holder of novel construction, in which the articles to be fried are placed, and by means of which the said articles are collectively introduced to and removed from the said frying-pan. The construction of the said holder is such as to admit of the turning or reversing of the said articles in the cooking operation, in order that both sides thereof may be cooked alike.

In the description of the said invention which follows, reference is had to the accompanying drawing, forming a part hereof, and in which—

Figure I is a longitudinal section of a frying-pan and a holder; Fig. II, a cross-section of the same; and Fig. III, a plan of the frying-pan and holder. Fig. IV is a cross-sectional view of the holder extended.

Similar letters of reference indicate similar parts of the invention in all the views.

A and B are the frames of the holder, hinged at *a*, and preferably constructed from tin-plate. The frames A and B are secured together when duplicated or closed by means of a hook, *b*, or similar device. The top and bottom of the holder are formed of bars *c*, which are secured at their ends to the sides of the frames. One of the frames is provided with lugs *d*, to which the ends of the bail or handle C are loosely attached.

The articles to be fried are placed upon the bars of either frame, the other frame being folded over them, and the two parts secured together by means of the hook *b*. The holder is then placed in a horizontal position and introduced into the frying-pan, which is usually provided with hot melted lard or other cooking material. The contents of the holder are allowed to remain in contact with the pan, and partially immersed in the lard until the lower sides of the said contents are sufficiently cooked, when the holder is withdrawn from the pan. The position of the holder is then reversed when it is again placed in the frying-pan, and the other side of the articles subjected to the cooking operation.

Upon the final withdrawal of the holder from the pan it is opened, and the cooked articles are removed by sliding them over the outer edge of the frame B to a dish or other receptacle.

It will be observed that the arrangement of the bars with reference to the triangularly-shaped ends of the holder is such that the fronts of the frames A and B offer no obstruction to the sliding of the cooked articles from the frame A to the one, B, and thence to the dish.

Having thus described our invention, what we claim as new, and wish to secure by Letters Patent of the United States, is—

The triangularly-ended frames A and B, hinged together as shown, and provided with bars *c* extending from the backs to the open fronts of the said frames, the whole being combined with a bail and handle, and constituting a reversible holder, for the purpose specified.

In testimony whereof we have hereunto subscribed our names this 6th day of December, in the year of our Lord, 1876.

RICHARD D. CLARK.
RICHARD WELLS.

Witnesses:
W. W. WHARTON,
THOS. MURDOCK.